(12) United States Patent
Zhong et al.

(10) Patent No.: US 8,810,751 B2
(45) Date of Patent: Aug. 19, 2014

(54) LIQUID CRYSTAL DISPLAY PANEL AND MANUFACTURING METHOD THEREOF

(75) Inventors: Xinhui Zhong, Shenzhen (CN); Kuancheng Lee, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 67 days.

(21) Appl. No.: 13/579,033

(22) PCT Filed: Jun. 19, 2012

(86) PCT No.: PCT/CN2012/077117
§ 371 (c)(1),
(2), (4) Date: Aug. 14, 2012

(87) PCT Pub. No.: WO2013/181864
PCT Pub. Date: Dec. 12, 2013

(65) Prior Publication Data
US 2013/0329152 A1      Dec. 12, 2013

(30) Foreign Application Priority Data
Jun. 7, 2012  (CN) .......................... 2012 1 0185964

(51) Int. Cl.
*G02F 1/1333*      (2006.01)
(52) U.S. Cl.
USPC .............. 349/86; 349/155; 349/156; 349/157

(58) Field of Classification Search
CPC ............ G02F 1/133377; G02F 1/1334; G02F 1/13394
USPC ............................................ 349/86, 155–157
See application file for complete search history.

(56) References Cited

U.S. PATENT DOCUMENTS

| | | | |
|---|---|---|---|
| 2003/0169387 A1* | 9/2003 | Liang et al. | 349/86 |
| 2009/0141214 A1* | 6/2009 | Suzuki et al. | 349/75 |
| 2012/0176577 A1* | 7/2012 | Yoshida | 349/155 |

* cited by examiner

*Primary Examiner* — Thanh-Nhan P Nguyen
(74) *Attorney, Agent, or Firm* — Cheng-Ju Chiang

(57) ABSTRACT

The present invention provides a liquid crystal display panel and a manufacturing method thereof. The liquid crystal display panel includes a first substrate, a plurality of sub-pixel regions formed on the first substrate, liquid crystal disposed in the sub-pixel regions and containing red, green, or blue dye, and a second substrate bonded to the first substrate. Each sub-pixel regions is surrounded by four connected baffle panels, which collectively form a black matrix block wall. The second substrate is positioned on the black matrix block wall to face the first substrate so as to enclose the liquid crystal in the sub-pixel regions. The liquid crystal display panel uses liquid crystal that contains red, green, or blue dye and a black matrix block wall that blocks the liquid crystal to form the R, G, B sub-pixels, so that the manufacture steps are lessened, the structure is simple, and the cost is low.

9 Claims, 5 Drawing Sheets

LIQUID CRYSTAL DISPLAY PANEL AND MANUFACTURING METHOD THEREOF

BACKGROUND OF THE INVENTION

1. Field of the Invention

The present invention relates to the field of liquid crystal displaying, and in particular to a liquid crystal display panel and a manufacturing method thereof.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal polymer molecules interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images.

As shown in FIG. 1, a liquid crystal display panel is generally composed of a color filter (CF) substrate 100, a thin film transistor (TFT) substrate 300, and liquid crystal (LC) 500 interposed between the CF substrate 100 and the TFT substrate 300, and spacers 700 and sealant 900 arranged between the CF substrate 100 and the TFT substrate 300. A general manufacturing process comprises a front stage of array process (including thin film, yellow light, etching, and film stripping), an intermediate stage of cell process (including bonding TFT substrate and the CF substrate), and a rear stage of assembling process (including mounting drive ICs and printed circuit board). The front stage of array process generally makes the TFT substrate for controlling the movement of liquid crystal molecules. The intermediate stage of cell process generally introduces the liquid crystal between the TFT substrate and the CF substrate. The rear stage of assembling process generally mounts the drive ICs and combining the printed circuit board to effect driving the liquid crystal molecules to rotate for displaying images.

The CF substrate comprises a black matrix (BM) formed thereon and sub-pixels of R, G, B are formed through the black matrix to allow the liquid crystal display panel to display color images. The R, G, B sub-pixels are generally formed through masking operation, printing, stamping, or spray coating. Such a process is complicated and expensive.

SUMMARY OF THE INVENTION

An object of the present invention is to provide a liquid crystal display panel, which has a simple structure, low cost, and a simple manufacturing process.

Another object of the present invention is to provide a method for manufacturing a liquid crystal display panel, which simplifies the manufacturing process of liquid crystal display panel and lowers down the manufacturing cost.

To achieve the objects, the present invention provides a liquid crystal display panel, which comprises: a first substrate, a plurality of sub-pixel regions formed on the first substrate, liquid crystal disposed in the sub-pixel regions and containing red, green, or blue dye, and a second substrate bonded to the first substrate. Each of the sub-pixel regions is surrounded by four sequentially-connected baffle panels and all the baffle panels collectively form a black matrix block wall. The second substrate is positioned on the black matrix block wall to face a surface of the first substrate so as to enclose the liquid crystal that contains red, green, or blue dye in the sub-pixel regions.

The baffle panels are respectively of first or second height. The first height is greater than the second height. The baffle panels between adjacent sub-pixel regions that are of different colors have the first height, while the baffle panels between adjacent sub-pixel regions that are of the same color have the second height.

The first substrate comprises a first glass substrate, an ITO common electrode layer formed on a surface of the first glass substrate, a first planarization layer formed on the ITO common electrode layer, and a first alignment layer formed on the first planarization layer.

The second substrate is a TFT substrate, which comprises a second glass substrate, an ITO pixel electrode layer formed on the second glass substrate, gate lines and data lines formed on the ITO pixel electrode layer, a TFT array formed on the ITO pixel electrode layer, a second planarization layer formed on the ITO pixel electrode layer and covering the gate lines, the data lines, and the TFT array, and a second alignment layer formed on the second planarization layer.

The liquid crystal display panel further comprises an enclosing resin frame that is disposed on the first substrate and set along circumferential edges of the first substrate.

The present invention also provides a method for manufacturing a liquid crystal display panel, which comprises the following steps:

Step 1: providing a first substrate;

Step 2: forming a predetermined plurality of sub-pixel regions on the first substrate, wherein each of the sub-pixel regions is surrounded by four sequentially-connected baffle panels and all the baffle panels collectively form a black matrix block wall, each of the sub-pixel regions being provided with a predetermined color that is set to correspond to one of red, green, and blue;

Step 3: filling liquid crystal that contains red, green, or blue dye into the sub-pixel regions according to predetermined locations so as to form R, G, B sub-pixels;

Step 4: applying sealant to the surface of the first substrate to form an enclosing resin frame;

Step 5: providing a second substrate;

Step 6: bonding the second substrate and the first substrate together in an opposing manner in a vacuum environment with the second substrate being tightly positioned on the black matrix block wall to face a surface of the first substrate thereby enclosing the liquid crystal containing red, green, or blue dye in the corresponding sub-pixel regions; and Step 7: subjecting the bonded second substrate and first substrate to ultraviolet (UV) curing or thermal curing so as to solidify the enclosing resin frame.

The baffle panels are respectively of first or second height. The first height is greater than the second height. The baffle panels between adjacent sub-pixel regions that are of different colors have the first height, while the baffle panels between adjacent sub-pixel regions that are of the same color have the second height.

The first substrate comprises a first glass substrate, an ITO common electrode layer formed on a surface of the first glass substrate, a first planarization layer formed on the ITO common electrode layer, and a first alignment layer formed on the first planarization layer; and the second substrate is a TFT substrate, which comprises a second glass substrate, an ITO pixel electrode layer formed on the second glass substrate, gate lines and data lines formed on the ITO pixel electrode layer, a TFT array formed on the ITO pixel electrode layer, a second planarization layer formed on the ITO pixel electrode layer and covering the gate lines, the data lines, and the TFT array, and a second alignment layer formed on the second planarization layer.

The black matrix block wall is formed on the first glass substrate with masking operation, printing, stamping, or spray coating.

Each of the sub-pixel regions is of a rectangular shape.

The efficacy of the present invention is that the present invention provides a liquid crystal display panel, which uses liquid crystal that contains red, green, or blue dye and a black matrix block wall that blocks the liquid crystal to form R, G, B sub-pixels, so that the manufacture steps are lessened, the structure is simple, and the cost is low. The present invention also provides a method for manufacturing a liquid crystal display panel, which simplifies the conventional CF substrate manufacturing process by forming the colors of R, G, B sub-pixels through dissolving dyes of different colors in the liquid crystal, whereby the R, G, B sub-pixels are formed at the same time when the liquid crystal is filled so that the manufacturing process of liquid crystal display panel is simplified and the manufacturing cost is reduced.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
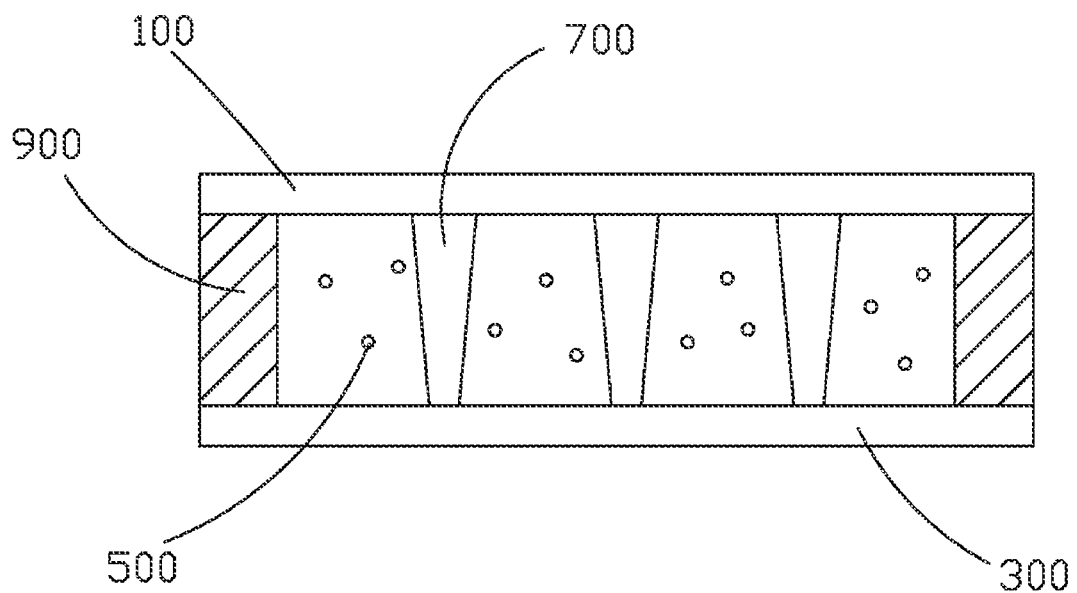
FIG. 1 is a schematic cross-sectional view showing a conventional liquid crystal display panel.
Figure 2:
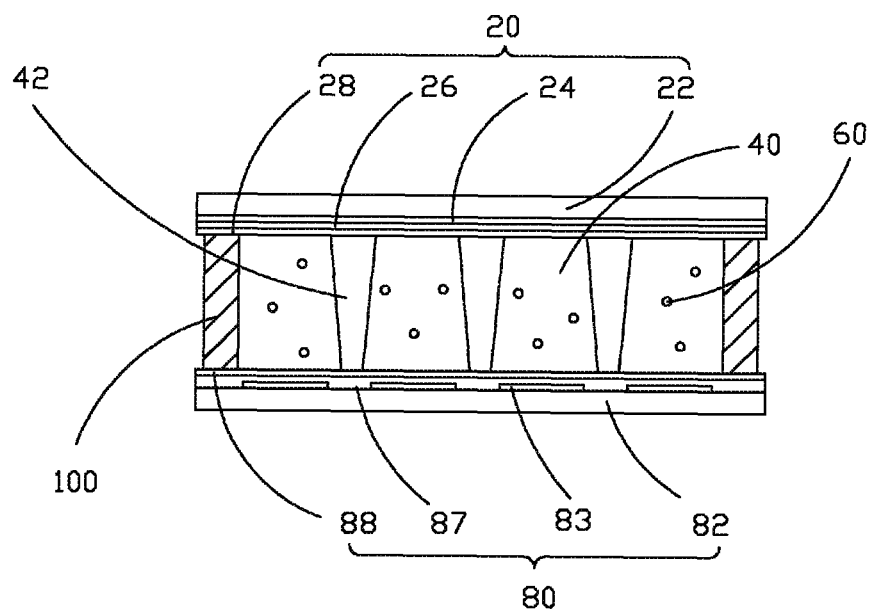
FIG. 2 is a schematic cross-sectional view showing a liquid crystal display panel according to the present invention.

Referring to FIG. 2, the present invention provides a liquid crystal display device, which comprises: a TFT substrate 2, a CF substrate 4 bonded to the TFT substrate 2 in an opposing manner, a plurality of photo spacers 6 arranged between the TFT substrate 2 and the CF substrate 4, an enclosing resin frame 8 arranged between the TFT substrate 2 and the CF substrate 4, and liquid crystal 9 received in the enclosing resin frame 8. Each of the photo spacers 6 has two opposite ends, which are respectively in contact with the CF substrate 4 and the TFT substrate 2. The contact area between the two opposite ends of the photo spacer 6 that is located at a central position of the CF substrate 4 and the TFT substrate 2 and the CF substrate 4 and the TFT substrate 2 is smaller than the contact area between the two opposite ends of a photo spacer 6 that is located at a marginal position of the CF substrate 4 and the TFT substrate 2 and the CF substrate 4 and the TFT substrate 2, whereby a central zone and a marginal zone of the TFT substrate 2 and the CF substrate 4 are provided with different bearing capabilities in such a way that the marginal zone has a relatively great bearing capability for supporting box thickness and the contact area in the central zone is relatively small to prevent the photo spacers 6 from deformation caused by excessively large frictional force, which leads to the occurrence of light leakage phenomenon. The structure is simple and the cost is low.

Figure 3:
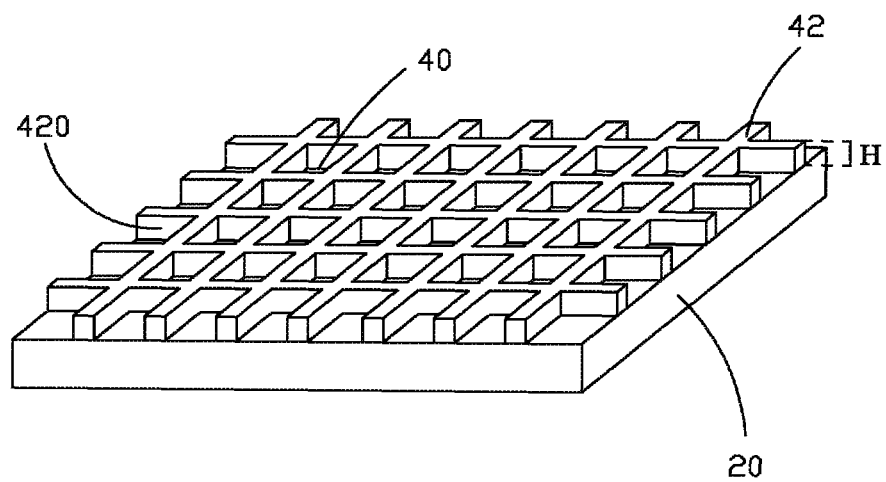
FIG. 3 is a perspective view showing a black matrix baffle wall of an embodiment of liquid crystal display panel according to the present invention.
Figure 4:
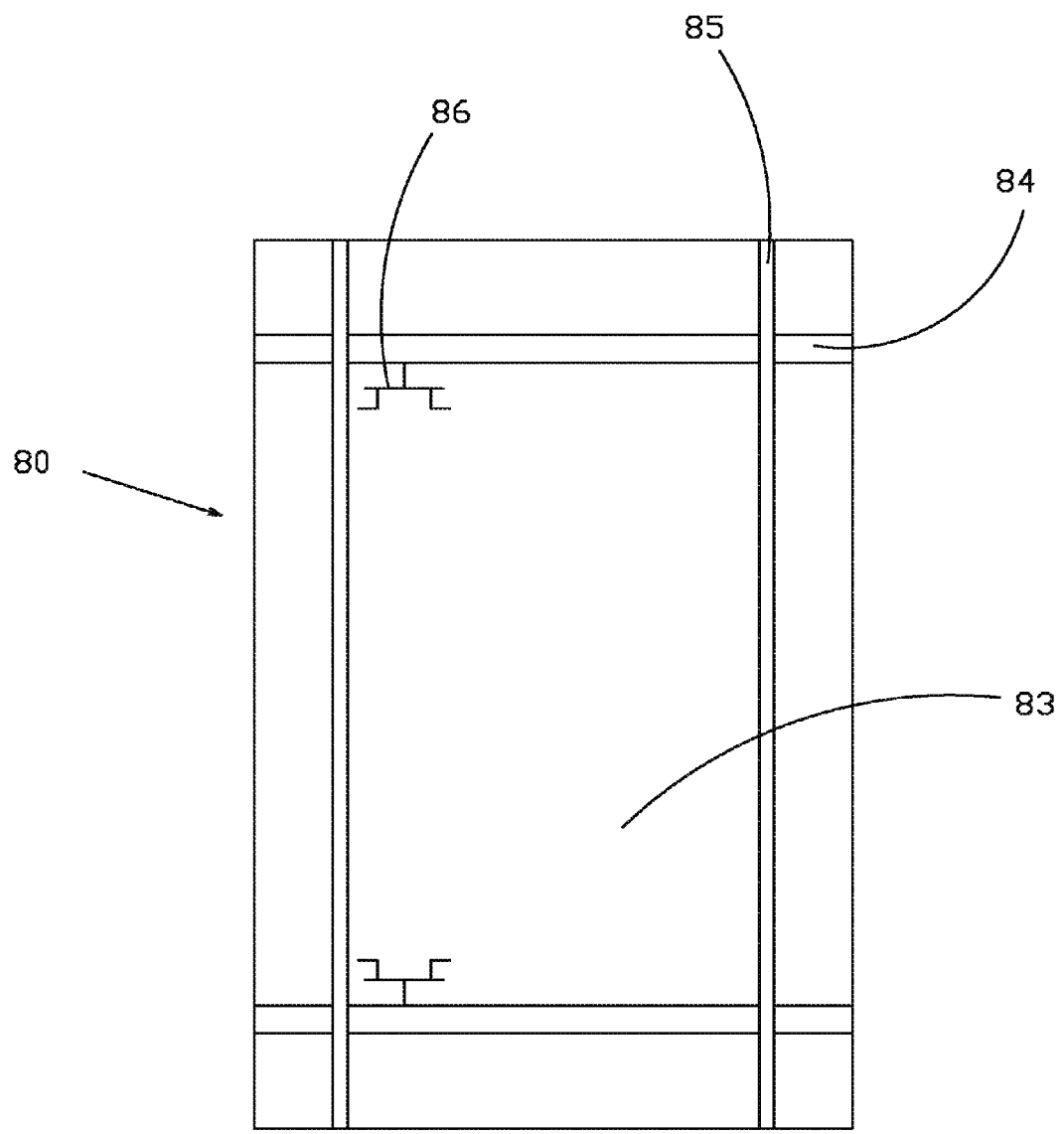
FIG. 4 is a plan view showing a pixel unit of a TFT substrate of the liquid crystal display panel according to the present invention.

Referring to FIGS. 2-4, the present invention provides a liquid crystal display panel, which comprises: a first substrate 20, a plurality of sub-pixel regions 40 formed on the first substrate 20, liquid crystal 60 disposed in the sub-pixel regions 40 and containing red, green, or blue dye, and a second substrate 80 bonded to the first substrate 20.

The first substrate 20 comprises a first glass substrate 22, an ITO (Indium Tin Oxides) common electrode layer 24 formed on a surface of the first glass substrate 22, a first planarization layer 26 formed on the ITO common electrode layer 24, and a first alignment layer 28 formed on the first planarization layer 26.

In the instant embodiment, the ITO common electrode layer 24, the first planarization layer 26, and the first alignment layer 28 are formed with masking operations.

The sub-pixel regions 40 are formed on the first alignment layer 28 and each of the sub-pixel regions 40 is surrounded by four sequentially-connected baffle panels 42. All the baffle panels 42 collectively form a black matrix block wall 420. The second substrate 80 is positioned on the black matrix block wall 420 to face a surface of the first substrate 20 so as to enclose the liquid crystal 60 that contains red, green, or blue dye in the sub-pixel regions 40.

In the instant embodiment, the liquid crystal 60 filled in adjacent ones of the sub-pixel regions 40 contain dyes of different colors. The baffle panels 42 have an identical height T with respect to the first substrate 20 in order to block and thus prevent liquid crystal 60 of different colors from flowing toward each other to cause color mixing.

The second substrate 80 is a TFT substrate, which comprises a second glass substrate 82, an ITO pixel electrode layer 83 formed on the second glass substrate 82, gate lines 84 and data lines 85 formed on the ITO pixel electrode layer 83, a TFT array 86 formed on the ITO pixel electrode layer 83, a second planarization layer 87 formed on the ITO pixel electrode layer 83 and covering the gate lines 84, the data lines 85, and the TFT array 86, and a second alignment layer 88 formed on the second planarization layer 87.

The liquid crystal display panel according to the present invention further comprises an enclosing resin frame that is disposed on the first substrate 20 and set along circumferential edges of the first substrate 20 to bond the first substrate 20 and the second substrate 80 together.

Figure 5:
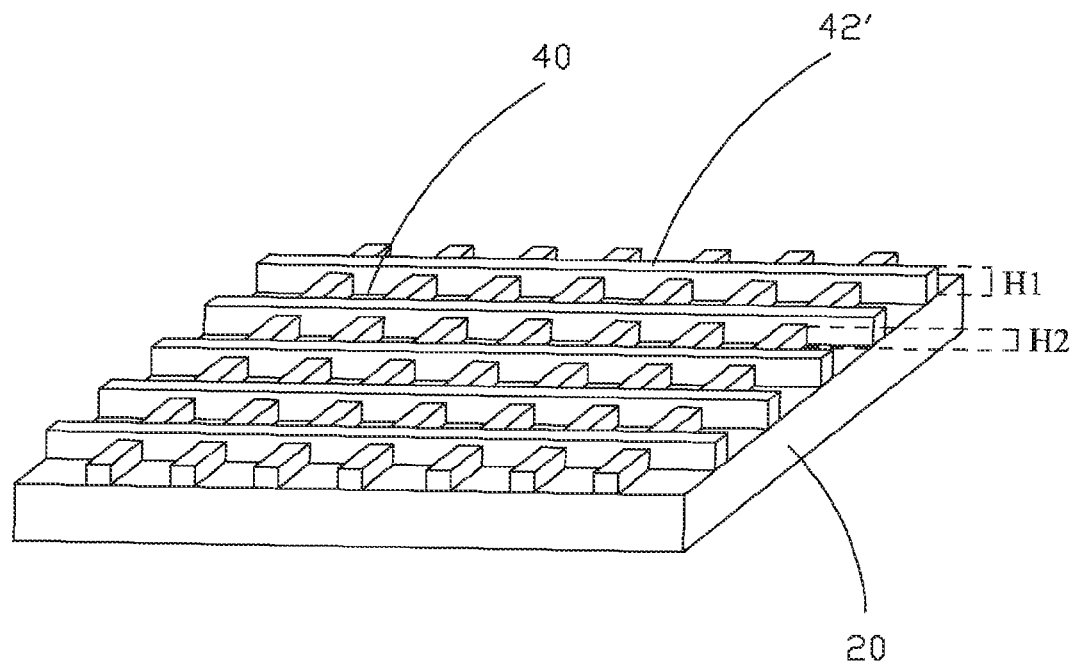
FIG. 5 is a perspective view showing a black matrix baffle wall of another embodiment of liquid crystal display panel according to the present invention.

Referring to FIG. 5, which is a perspective view showing a black matrix block wall of another embodiment of the liquid crystal display panel according to the present invention, reference being also had to FIG. 2, in the instant embodiment, the baffle panels 42' are respectively of first or second height H1, H2. The first height H1 is greater than the second height H2. The baffle panels 42' between adjacent sub-pixel regions 40 that are of different colors have the first height H1, while the baffle panels 42' between adjacent sub-pixel regions 40 that are of the same color have the second height H2, whereby the liquid crystal 60 of the sub-pixel regions 40 that do not have the same color is completely isolated from each other, but the liquid crystal 60 of the sub-pixel regions 40 that have the same color is allowed to flow toward each other to enhance the result of displaying.

The liquid crystal display panel according to the present invention uses liquid crystal that contains red, green, or blue dye and a black matrix block wall that blocks the liquid crystal to form R, G, B sub-pixels, so that the manufacture steps are lessened, the structure is simple, and the cost is low.

Figure 6:
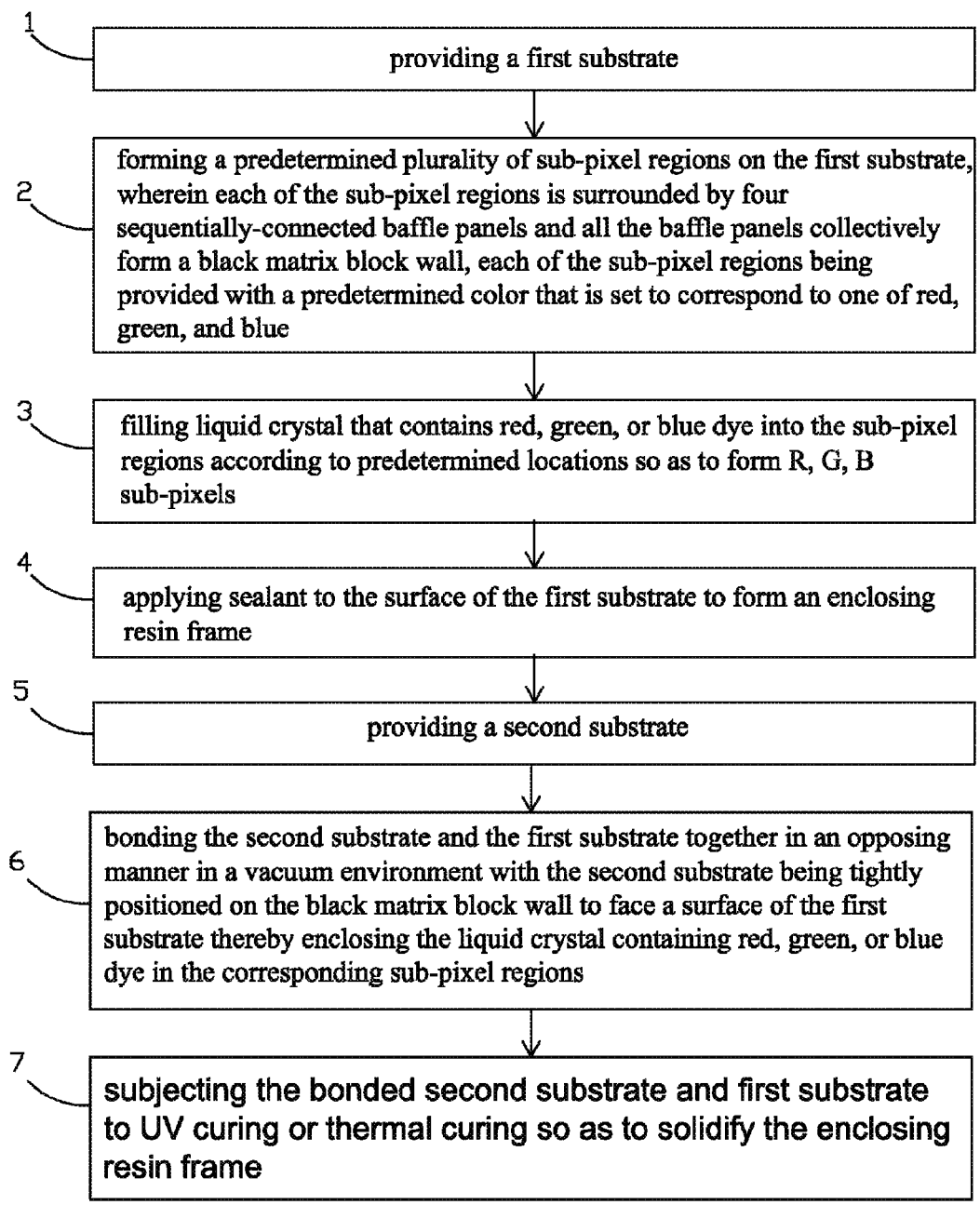
FIG. 6 is a flow chart illustrating a method for manufacturing a liquid crystal display panel according to the present invention.

Referring to FIG. 6, in combination with FIGS. 2-5, the present invention also provides a method for manufacturing a liquid crystal display panel, which comprises the following steps:

Step 1: providing a first substrate 20.

The first substrate 20 comprises a first glass substrate 22, an ITO common electrode layer 24 formed on a surface of the first glass substrate 22, a first planarization layer 26 formed on the ITO common electrode layer 24, and a first alignment layer 28 formed on the first planarization layer 26.

In the instant embodiment, the ITO common electrode layer 24, the first planarization layer 26, and the first alignment layer 28 are formed with masking operations.

Step 2: forming a predetermined plurality of sub-pixel regions 40 on the first substrate 20, wherein each of the sub-pixel regions 40 is surrounded by four sequentially-connected baffle panels 42 and all the baffle panels 42 collectively form a black matrix block wall 420. Each of the sub-pixel regions 40 is provided with a predetermined color that is set to correspond to one of red, green, and blue.

In the instant embodiment, the black matrix block wall 420 is formed on the first glass substrate 20 with masking operation, printing, stamping, or spray coating. Each of the sub-pixel regions 40 is of a rectangular shape. The baffle panels 42 have an identical height T with respect to the first substrate 20.

Step 3: filling liquid crystal 60 that contains red, green, or blue dye into the sub-pixel regions 40 according to predetermined locations so as to form R, G, B sub-pixels.

In the instant embodiment, the liquid crystal 60 filled in adjacent ones of the sub-pixel regions 40 contain dyes of different colors.

Step 4: applying sealant to the surface of the first substrate 20 to form an enclosing resin frame 100.

Step 5: providing a second substrate 80.

The second substrate 80 is a TFT substrate, which comprises a second glass substrate 82, an ITO pixel electrode layer 83 formed on the second glass substrate 82, gate lines 84 and data lines 85 formed on the ITO pixel electrode layer 83, a TFT array 86 formed on the ITO pixel electrode layer 83, a second planarization layer 87 formed on the ITO pixel electrode layer 83 and covering the gate lines 84, the data lines 85, and the TFT array 86, and a second alignment layer 88 formed on the second planarization layer 87.

Step 6: bonding the second substrate 80 and the first substrate 20 together in an opposing manner in a vacuum environment with the second substrate 80 being tightly positioned on the black matrix block wall 420 to face a surface of the first substrate 20 thereby enclosing the liquid crystal 60 containing red, green, or blue dye in the corresponding sub-pixel regions 40.

Step 7: subjecting the bonded second substrate 80 and first substrate 20 to ultraviolet (UV) curing or thermal curing so as to solidify the enclosing resin frame 100.

The present invention provides a method for manufacturing a liquid crystal display panel, which simplifies the conventional CF substrate manufacturing process by forming the colors of R, G, B sub-pixels through dissolving dyes of different colors in the liquid crystal, whereby the R, G, B sub-pixels are formed at the same time when the liquid crystal is filled so that the manufacturing process of liquid crystal display panel is simplified and the manufacturing cost is reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display panel, comprising: a first substrate, a plurality of sub-pixel regions formed on the first substrate, liquid crystal disposed in the sub-pixel regions and containing red, green, or blue dye, and a second substrate bonded to the first substrate, each of the sub-pixel regions being surrounded by four sequentially-connected baffle panels, all the baffle panels collectively forming a black matrix block wall, the second substrate being positioned on the black matrix block wall to face a surface of the first substrate so as to enclose the liquid crystal that contains red, green, or blue dye in the sub-pixel regions;

wherein the baffle panels are respectively of first or second height, the first height being greater than the second height, the baffle panels between adjacent sub-pixel regions that are of different colors having the first height, the baffle panels between adjacent sub-pixel regions that are of the same color having the second height to allow the liquid crystal of the same color to flow toward each other to enhance displaying performance.

2. The liquid crystal display panel as claimed in claim 1, wherein the first substrate comprises a first glass substrate, an ITO common electrode layer formed on a surface of the first glass substrate, a first planarization layer formed on the ITO common electrode layer, and a first alignment layer formed on the first planarization layer.

3. The liquid crystal display panel as claimed in claim 1, wherein the second substrate is a TFT substrate, which comprises a second glass substrate, an ITO pixel electrode layer formed on the second glass substrate, gate lines and data lines formed on the ITO pixel electrode layer, a TFT array formed on the ITO pixel electrode layer, a second planarization layer formed on the ITO pixel electrode layer and covering the gate lines, the data lines, and the TFT array, and a second alignment layer formed on the second planarization layer.

4. The liquid crystal display panel as claimed in claim 1 further comprising an enclosing resin frame that is disposed on the first substrate and set along circumferential edges of the first substrate.

5. A liquid crystal display panel, comprising: a first substrate, a plurality of sub-pixel regions formed on the first substrate, liquid crystal disposed in the sub-pixel regions and containing red, green, or blue dye, and a second substrate bonded to the first substrate, each of the sub-pixel regions being surrounded by four sequentially-connected baffle panels, all the baffle panels collectively forming a black matrix block wall, the second substrate being positioned on the black matrix block wall to face a surface of the first substrate so as to enclose the liquid crystal that contains red, green, or blue dye in the sub-pixel regions;

wherein the baffle panels are respectively of first or second height, the first height being greater than the second height, the baffle panels between adjacent sub-pixel regions that are of different colors having the first height, the baffle panels between adjacent sub-pixel regions that are of the same color having the second height to allow the liquid crystal of the same color to flow toward each other to enhance displaying performance;

wherein the first substrate comprises a first glass substrate, an ITO common electrode layer formed on a surface of the first glass substrate, a first planarization layer formed on the ITO common electrode layer, and a first alignment layer formed on the first planarization layer;

wherein the second substrate is a TFT substrate, which comprises a second glass substrate, an ITO pixel electrode layer formed on the second glass substrate, gate lines and data lines formed on the ITO pixel electrode layer, a TFT array formed on the ITO pixel electrode layer, a second planarization layer formed on the ITO pixel electrode layer and covering the gate lines, the data lines, and the TFT array, and a second alignment layer formed on the second planarization layer; and further comprising an enclosing resin frame that is disposed on the first substrate and set along circumferential edges of the first substrate.

6. A method for manufacturing a liquid crystal display panel, comprising the following steps:
(1) providing a first substrate;
(2) forming a predetermined plurality of sub-pixel regions on the first substrate, wherein each of the sub-pixel regions is surrounded by four sequentially-connected baffle panels and all the baffle panels collectively form a black matrix block wall, each of the sub-pixel regions being provided with a predetermined color that is set to correspond to one of red, green, and blue, wherein the baffle panels are respectively of first or second height, the first height being greater than the second height, the baffle panels between adjacent sub-pixel regions that are of different colors having the first height, the baffle panels between adjacent sub-pixel regions that are of the same color having the second height to allow the liquid crystal of the same color to flow toward each other to enhance displaying performance;
(3) filling liquid crystal that contains red, green, or blue dye into the sub-pixel regions according to predetermined locations so as to form R, G, B sub-pixels;
(4) applying sealant to the surface of the first substrate to form an enclosing resin frame;
(5) providing a second substrate;
(6) bonding the second substrate and the first substrate together in an opposing manner in a vacuum environment with the second substrate being tightly positioned on the black matrix block wall to face a surface of the first substrate thereby enclosing the liquid crystal containing red, green, or blue dye in the corresponding sub-pixel regions; and
(7) subjecting the bonded second substrate and first substrate to ultraviolet (UV) curing or thermal curing so as to solidify the enclosing resin frame.

7. The method for manufacturing a liquid crystal display panel as claimed in claim 6, wherein the first substrate comprises a first glass substrate, an ITO common electrode layer formed on a surface of the first glass substrate, a first planarization layer formed on the ITO common electrode layer, and a first alignment layer formed on the first planarization layer; and the second substrate is a TFT substrate, which comprises a second glass substrate, an ITO pixel electrode layer formed on the second glass substrate, gate lines and data lines formed on the ITO pixel electrode layer, a TFT array formed on the ITO pixel electrode layer, a second planarization layer formed on the ITO pixel electrode layer and covering the gate lines, the data lines, and the TFT array, and a second alignment layer formed on the second planarization layer.

8. The method for manufacturing a liquid crystal display panel as claimed in claim 6, wherein the black matrix block wall is formed on the first glass substrate with masking operation, printing, stamping, or spray coating.

9. The method for manufacturing a liquid crystal display panel as claimed in claim 6, wherein each of the sub-pixel regions is of a rectangular shape.

\* \* \* \* \*